(No Model.)  6 Sheets—Sheet 1.

H. J. GEBHARDT.
WIRE AND PICKET FENCING MACHINE.

No. 503,207.  Patented Aug. 15, 1893.

Witnesses.
J. Jensen.
O. J. Hawley.

Inventor:
Henry J. Gebhardt.
By Paul H. Morwin attys.

(No Model.) 6 Sheets—Sheet 3.

H. J. GEBHARDT.
WIRE AND PICKET FENCING MACHINE.

No. 503,207. Patented Aug. 15, 1893.

Witnesses.
J. Jessen.
O. G. Hawley.

Inventor:
Henry J. Gebhardt,
By Paul H. Merwin attys (No Model.) 6 Sheets—Sheet 4.

H. J. GEBHARDT.
WIRE AND PICKET FENCING MACHINE.

No. 503,207. Patented Aug. 15, 1893.

Witnesses.
J Jessen.
O T Hawley

Inventor
Henry J. Gebhardt.
By Paul J Merwin att'ys.

(No Model.)

H. J. GEBHARDT.
WIRE AND PICKET FENCING MACHINE.

No. 503,207. Patented Aug. 15, 1893.

Fig. 13.

Witnesses,
C. E. Van Doran.
Alfred T. Gage

Inventor,
Henry J. Gebhardt.
By Paul A. Morwin
Attorneys.

(No Model.)  
6 Sheets—Sheet 6.

H. J. GEBHARDT.
WIRE AND PICKET FENCING MACHINE.

No. 503,207. Patented Aug. 15, 1893.

Witnesses.  
O. E. Van Doren  
Alfred T. Gage.

Inventor,  
Henry J. Gebhardt.  
By Paul & Merwin  
Attorneys.

UNITED STATES PATENT OFFICE.

HENRY J. GEBHARDT, OF MINNEAPOLIS, MINNESOTA.

WIRE-AND-PICKET-FENCING MACHINE.

SPECIFICATION forming part of Letters Patent No. 503,207, dated August 15, 1893.

Application filed August 8, 1892. Serial No. 442,458. (No model.)

*To all whom it may concern:*

Be it known that I, HENRY J. GEBHARDT, of Minneapolis, in the county of Hennepin and State of Minnesota, have invented certain new and useful Improvements in Wire-and-Picket-Fencing Machines, of which the following is a specification.

My invention relates to automatic means for making picket fencing and the object of the invention is to provide a cheap, simple, and light running machine for power use and one which will produce a fencing in which the wires will all be evenly twisted and drawn tightly around the pickets, so much so as to prevent their slipping; and in which all pickets will be perfectly parallel and even.

A further object is to provide a machine adapted for rapid work.

To this end my invention consists in a peculiar releasing mechanism for the twisters, a series of rows of fixed stops against which the several adjacent newly-placed pickets are firmly held to compel absolute alignment; a particular mechanism for forcibly drawing out the fence when it is released from said stops; in means for accurately controlling the action of said drawing out mechanism; in a novel collapsible reel whereon the fence is wound as it is made; and in various novel constructions and combinations all as hereinafter described and particularly pointed out in the claims.

The invention will be more readily understood by reference to the accompanying drawings, forming a part of this specification, in which—

As shown in the drawings, the moving parts of my machine are fixed upon a suitable frame, the upper part of which consists of longitudinal sills 2 and the cross-beams 4, 5 and 6.

Figure 11:
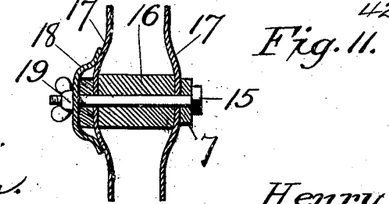
Fig. 11 is an enlarged sectional detail on the line *u—u* of Fig. 2 and showing the adjustable tension device arranged in connection with the spool.
Figure 13:
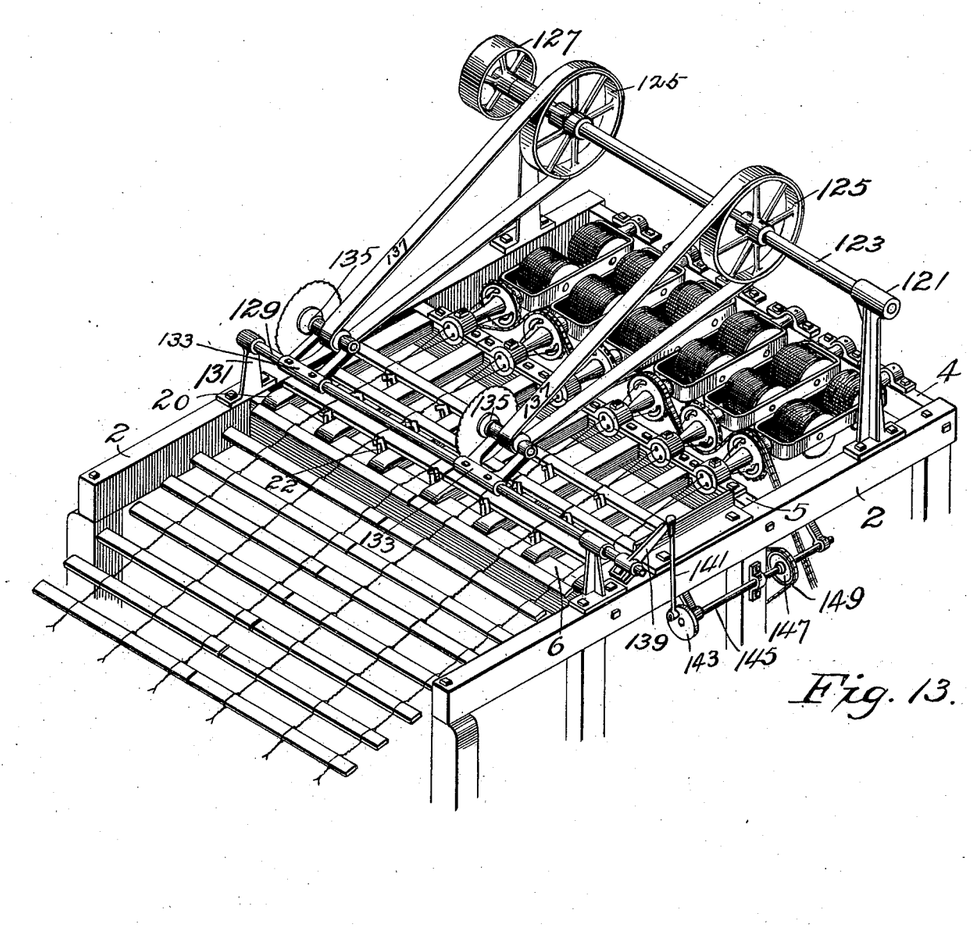
Fig. 13 is a perspective view showing particularly the saws and the means for operating them.
Figures 14, 15, 16:
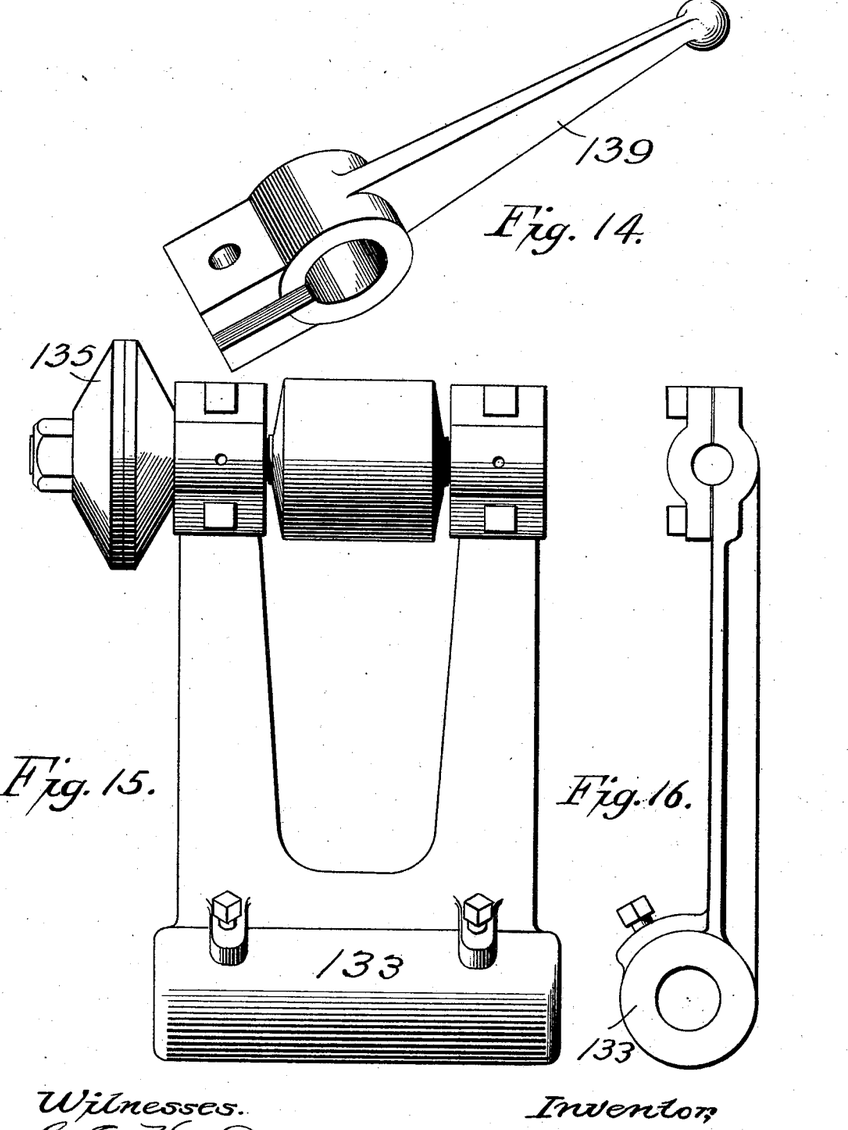
Figs. 14, 15, and 16 are details of the means for holding and operating the saws.

The spool-frames 7 are each provided with a sprocket-wheel 8, and the short shafts or studs 7' extend longitudinally between the beams 4 and 5, being secured thereon in bearings 10 and 11, the latter of which embrace the twister-heads 12 formed on the ends of said frames and which are each provided with two holes 13 through which the two strands of wire extend, said strands passing through openings or slots in the sprocket-wheel 8 and being wound upon the spools 14 journaled on bolts 15 passing through the sides of the spool frames. The spools are preferably made as shown in Fig. 11, being composed of the wooden hubs 16 and the stamped side plates or disks 17 having the convex outer sides. This form is given them in order to render the disks rigid and firm. The bolt 15 extends through the hub and on its threaded end I arrange the spring 18 arching over the side bar of the twister frame and having its ends adapted to bear on the disk 17 but otherwise free from the spool frame, being fastened in place by the thumb-nut 19 arranged on the bolt 15 and by means of which the pressure of the spring on the sides of the spool may be regulated to overcome the momentum of the spool, which, when the machine is stopped might otherwise cause the wire to be unwound therefrom. The supporting slats or bars 20 extend between and are fastened upon the cross-beams 5 and 6 to uphold the pickets upon which, as will hereinafter be seen, a considerable tension is exerted. Between these bars 20 are two or more longitudinal and rotatable shafts 21 bearing the longitudinally adjustable picket-stops 22 secured firmly thereon by set-screws. These shafts lie below the level of the cross-bars 20 and have their ends fastened in socket bearings 23 preferably on the inner sides of the cross bars 5 and 6. The forward ends of the shafts extend through the bar 5 and are provided with the crank arms 24 which are pivoted upon the common reciprocating bar 25 normally held in position to uphold the fixed stops or holders by the retractive spring 26. On each of the shafts 21 I arrange a picket pusher consisting of a sliding collar 27 provided with a vertical arm 28. These arms are operated by means of the several crank-arms 29 fastened on the rock-shaft 30 which shaft is operated by the treadle 31 connected to the crank-arm 32 of said shaft by the rod 33 (see Figs. 2 and 3). The treadle and the arm 32 are normally held up by the spring 34.

In addition to the rigid longitudinally unyielding picket-stops or holders 22, I provide one or a series of yielding picket-dogs 36 arranged on the sliding sleeve 37 at the same distance apart as the dogs 22. The sleeve 37 slides on the square rock-shaft 38 and is normally held forward thereon by the cushion spring 39, the forward movement of the sleeve and dogs being limited by the adjustable collar 40. This shaft also has a crank-arm 24 pivoted on the bar 25 so that the dogs 36 are lowered simultaneously with those numbered 22 to carry all out of the way of the fence. The operation of these yielding dogs with respect to the shifting belt of the fixed and loose pulley on the reel-operating shaft will be hereinafter described.

The spool-frames and the twister-heads are operated from the large sprocket-wheel 41 loosely journaled on the shaft 42 and from which the endless sprocket-chain belt 43 passes over the idler 44 and thence under and over the several sprocket wheels 8, the chain passing from the last sprocket back to the large wheel. The shaft 42 is continuously driven by a belt 45 extending over a smaller sprocket wheel 46 thereon, and over a much smaller one 47 on the power shaft 48 driven by a belt passing over the pulley 49 thereon.

Bearings for the power-shaft are provided on the intermediate cross-bars of the frame, and the shaft bears the wide pulley 51 from which a twisted belt 52 extends across the machine to operate on either the loose pulley 53, or the fixed one 54 arranged on the shaft 55 having bearings 56 on the side of the frame and provided at its rear end with the worm 57. This worm engages the worm gear wheel 58 secured on the short shaft 59 having the chuck-head 60 provided with a rectangular socket to receive the square ends of the reel shaft 61. By reference to Figs. 4 to 7 it will be seen that a smooth surface friction wheel 62 is secured upon the rear end of the short shaft 42 which revolves continuously.

On one of the spokes of the sprocket-wheel 41 I provide a sleeve or boss 63 and secure therein the long pivot pin 64 having on its outer end the small friction roller or sleeve 65. On the middle part of the pin I pivot or journal the two semicircular halves 66 and 67 of the friction clutch, the same being strengthened by the ribs 68. When these parts engage the rim of the wheel 62 they are carried around thereby to revolve the loose sprocket-wheel 41 thereby operating all of the spool-frames and the twister-heads connected therewith.

The clutch parts 66 and 67 are each provided with a lug 69 which are normally pressed together by the spring 70 arranged on the bolt 71 passing through the holes in the parts 69 and having the head 71' and the adjustable nut 72 for altering the tension of the spring.

To disengage the parts of the clutch and thereby stop the twisters I provide between the lugs 69 a pry-bar 73 held in place by the bolt 71 passing through a slot 74 in said bar. This bar revolves with the clutch and is stopped by the gravity-pawl 75 pivoted at 76 on the bar 5 and provided at its lower end with the soft rubber cushion roll 76'. This cushioned pawl is made in the form of a loop, the sides of which are strengthened by the strap 77 and on the rear side of the loop I provide the inclined lug 78 arranged to be engaged by the lateral lug 79 provided on the vertically movable bar 80 which bar has the transversely extending lugs 81 each provided with a small friction roller and between which extend the ends of the crank arm 82 provided on the rock-shaft 30. When the treadle 31 is forced down the bar 80 is raised to throw out the lower end of the pawl 75 thereby freeing the pry-bar whereupon the parts 66 and 67 instantly grip upon the wheel 62 and are carried around thereby to operate the twisters. By the time the clutch has made a single revolution the pawl 75 returns into the path of the pry-bar 73 which engaging the same instantly forces apart the halves of the clutch.

For at once operating the picket-holding-stops and for shifting the twisted belt to operate the reel I provide the cam-lever 83 pivoted at 84 upon the bracket 85 and having the angular foot 86, the vertical edge 87 of which is in position to be engaged by the end 65 of the pin 64 when near the end of the revolution of the clutch. The upper end of the lever 83 is of irregular form being constructed as shown to permit the pin on the clutch to return into position while allowing the lever, which is weighted, to fall back into its normal position and raise the stops 22. As the clutch is revolved the roller 65 on the pin engages the foot 86 and forces the same back into the dotted position of Fig. 5 thereby drawing back the bar 25 connected with the lever 83 by the strap 88 which movement throws down the picket stops to free the pickets. At the same instant the belt 52 is shifted onto the fixed pulley to operate the reel to forcibly draw out and wind up the fence.

Figures 4, 5:
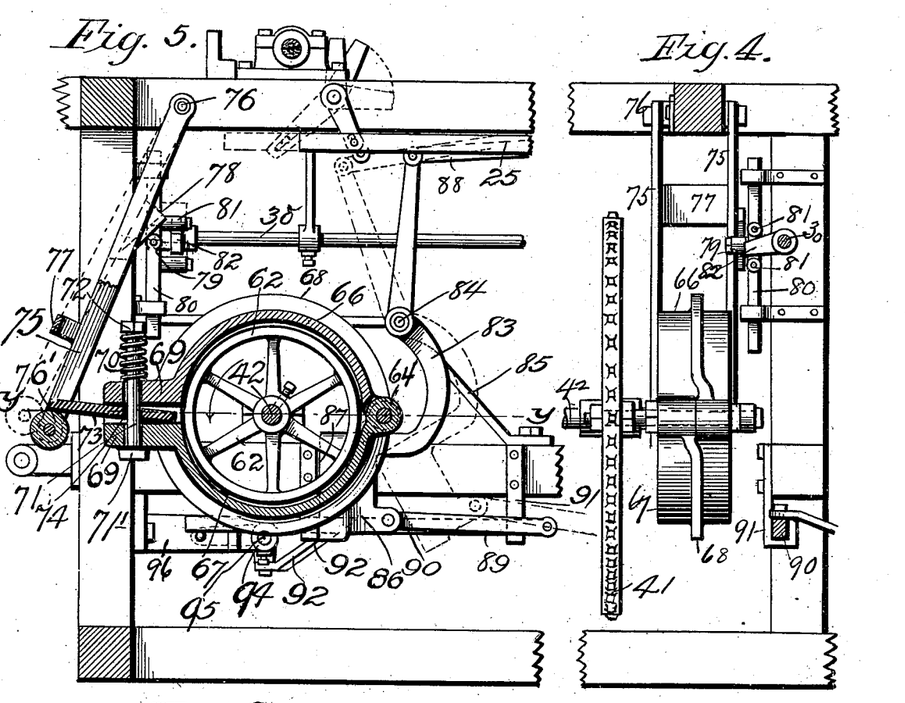
Fig. 4 is a partial view of the machine showing the friction clutch arranged in connection with the driving wheel from which the spool-frames are operated.
Fig. 5 is a transverse view thereof in section and showing also the cam-lever for operating the belt shifter and the picket dogs.
Figure 6:
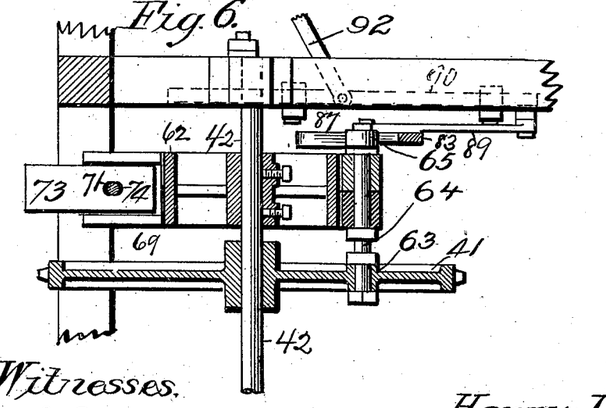
Fig. 6 is a plan view on the line *y—y* of Fig. 5.
Figure 7:
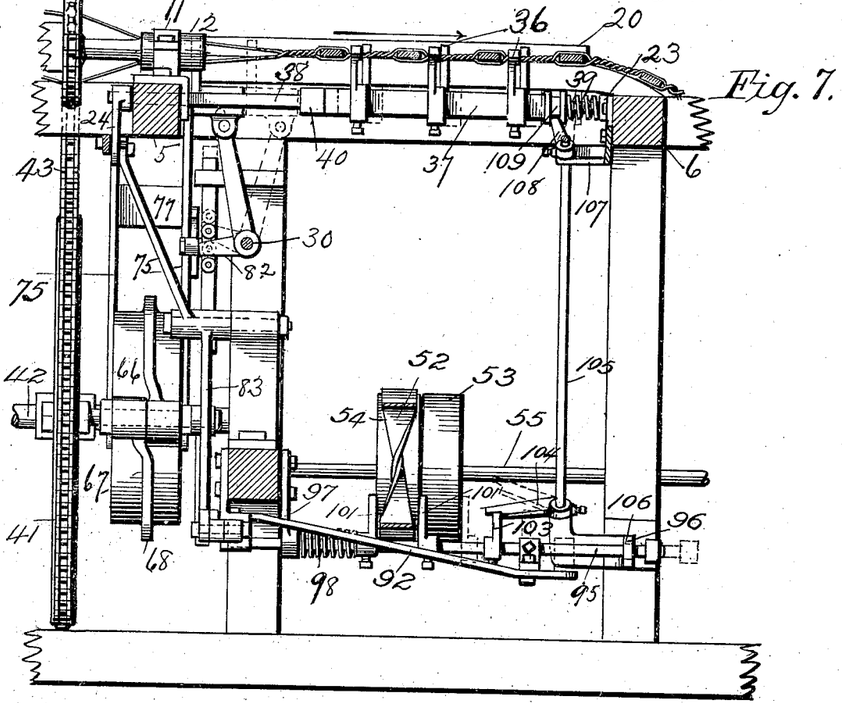
Fig. 7 is a longitudinal sectional elevation showing in particular the yielding picket-dogs and the mechanism for operating the belt shifter.
Figures 8, 9, 10:
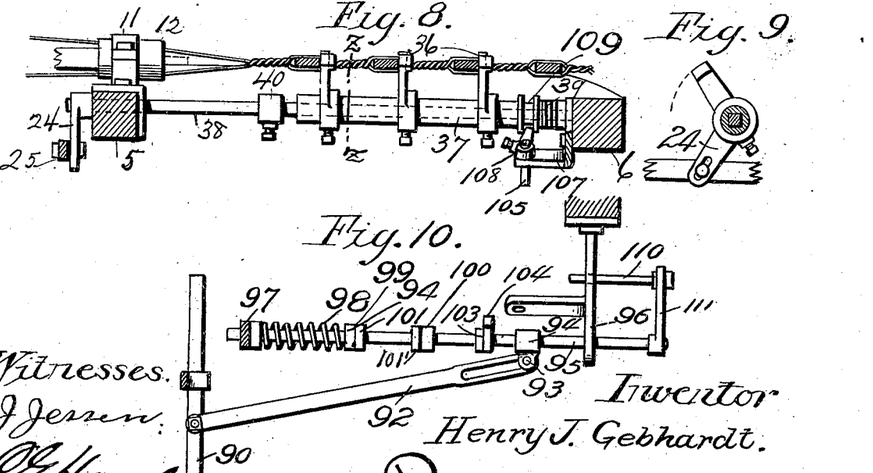
Fig. 8 is a detached view showing the yielding picket dogs.
Fig. 9 is a sectional view on the line *z—z* of Fig. 8.
Fig. 10 is a detached plan view of the belt shifting mechanism.

This is accomplished by the means shown in Figs. 5, 7 and 8 where it will be seen that a connecting rod or link 89 extends from the foot 86 to the rear end of the horizontally movable bar 90 arranged in the guides 91 and upon which the forward end of the long link 92 is pivoted. This link has the slotted rear end arranged to engage the pin 93 on the collar 94 secured to the shifting bar 95 adapted to slide in the fixed bearings 96 and 97 secured on the frame. The bar is held back by the coiled spring 98 acting against the collar 99.

The collars 99 and 100 are provided with the arms 101 and 101' which engage opposite edges of the continuously running belt 52 to move the same back and forth when the shifter-bar is operated. Thus it will be seen that at the same instant that the stops are disengaged from the slats the worm shaft 55 begins to revolve. The lever 83 may return to position regardless of the position of the bar 95 owing to the arrangement of the slot in the link 92.

It will be seen that on the bar 95 is a third arm 103 with which the stop-arm 104 engages to hold forward the shipper-arms 101 and the belt. This stop or lock 104 is secured on the lower end of the slanting rock rod or shaft 105 journaled in the brackets 106 and 107 and bearing on its upper end the short crank arm 108 which projects into the groove 109 arranged in the rear end of the sleeve 37. As the yielding lugs and the sleeve are drawn back by the winding up of the fence the shaft 105 is rotated to disengage the stop 104 from the arm 103 whereupon the belt will be instantly shifted to the loose pulley 53. The shaft 95 is prevented from revolving by the parallel piece 110 projecting from the arm 111 through a hole in the bracket 96.

Figures 1, 12:
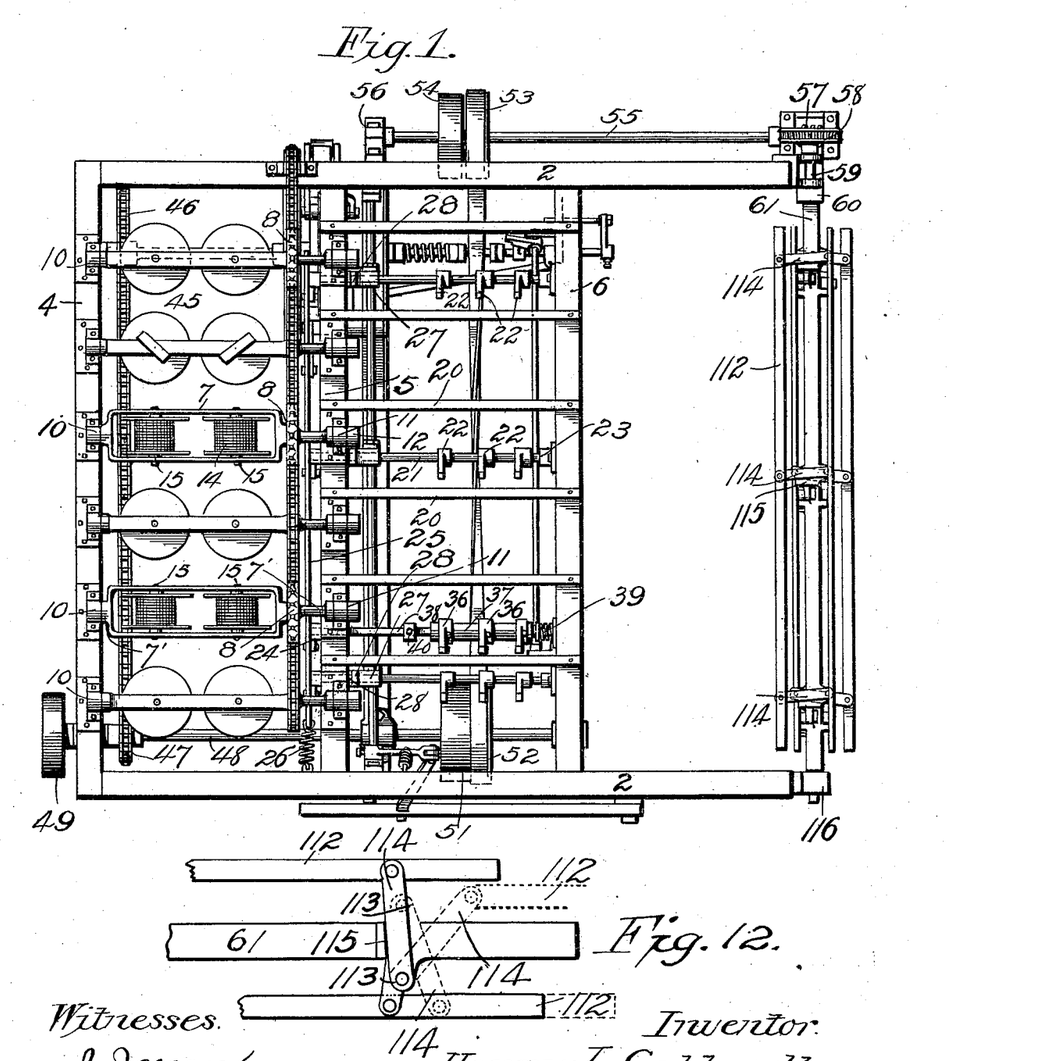
Figure 1 is a plan view of a machine embodying my invention.
Fig. 12 is an enlarged view of one end of the bundle reel.
Figure 2:
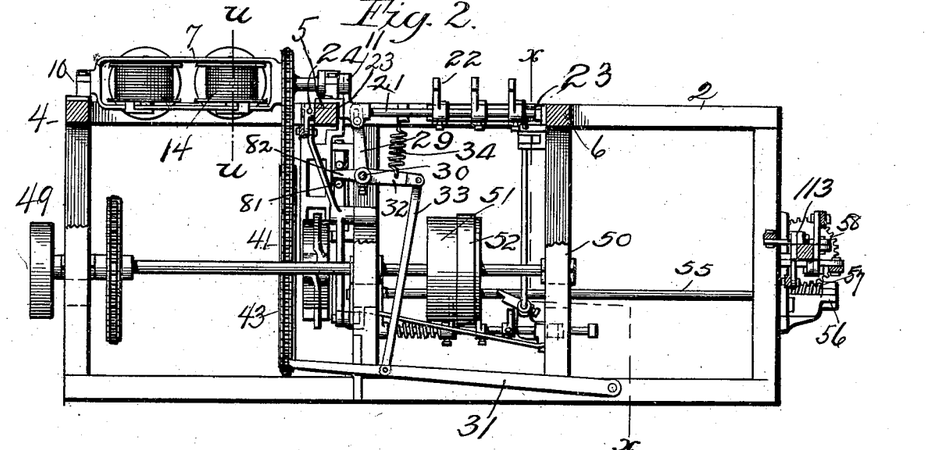
Fig. 2 is a side view thereof with a portion of the frame cut away.
Figure 3:
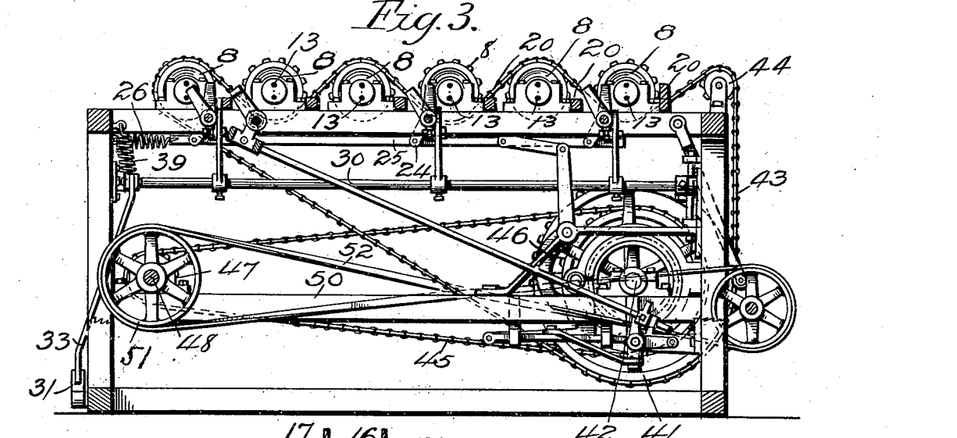
Fig. 3 is a transverse elevation on the line *x—x* of Fig. 2.

Viewed from a point of convenience one of the most important features of my machine is the collapsible reel shown in Figs. 1, 2 and 12. In connection with the square shaft 61 I employ the four parallel bars 112. The shaft at each of three points is provided with lugs 113 on which are pivoted the links 114 extending to pivotal connection on the bars 112. These bars are arranged to set back against the backwardly inclined shoulders or ribs 115 on the shaft 61 and when thus set back of the dead centers it will be seen that a lateral strain on the bars 112 will only cause them to set more firmly in place. One end of the shaft 61 is secured in the socket of the head 60 while the other end is locked in the separable bearing 116 which may be opened for the removal of the shaft. After a complete bundle has been wound on the reel, the strip of fence is cut and the loose end fastened on the bundle after which the shaft 61 is removed from its bearings and the bundle rolled away with the shaft in it. Although the fencing is wound very tightly on the reel, owing to the straining mechanism described it is only necessary to apply a slight blow or jerk to the end of the shaft 61 to force the links by the dead centers whereupon the reel collapses and occupies so small a space as to be readily withdrawn from within the bundle.

It is obvious that in the construction of the reel a greater or less number of rods 112 and the pivot links thereof may be employed. This is also true of other parts of the machine which may be multiplied at pleasure. It is often desirable to construct a fence of this kind with the pickets of sufficient length that the fence may be cut in two, thus making double the amount of fencing with shorter pickets, and where it is desired to construct a fence with short pickets it is found to be most advantageous to make the fence with pickets of double the length required and then cut the pickets in two.

In connection with this machine therefore I provide means (shown in Figs. 13, 14, 15 and 16) for cutting the pickets immediately after the wires are twisted about them. For this purpose I provide in suitable bearings 121, upon the frame of the machine, the shaft 123 provided with pulleys 125 and the driving pulley 127. I also provide upon the frame of the machine the rock shaft 129 mounted in bearings 131. This shaft has secured to it the saw arbor heads 133, in which are mounted the arbors of the saws 135, said saws being driven by suitable belts 137 from the pulleys 125 on the shaft 123. The heads 133 are adjustable longitudinally on the shaft 129 so that the saw may be set at any desired position for the purpose of cutting the fence into any desired lengths. The shaft 129 is also provided with the arm 139 connected by a rod 141 to the crank disk 143, said disk being mounted upon the shaft 145 supported in suitable bearings upon the frame of the machine and provided with the sprocket wheel 147 driven by a chain 149 from a suitable sprocket connected to the sprocket wheel 41, or by any other suitable means. With this construction and arrangement it will be seen that the saws are driven continuously and that they are alternately raised and lowered, whereby, after each picket is cut in two by the saw, the saw is raised to be clear of the picket for the purpose of permitting the picket to be drawn forward without contact with the saw. The saw is then again lowered and brought against the next picket which is cut in two, and the saw is again raised as before. This operation is repeated as long as desired.

When it is desired to use the machine without cutting the pickets the saws are placed in an elevated position and the driving belt removed so that they remain inoperative.

From the foregoing detailed description the use and operatoin of the machine will be readily understood to be as follows: The engine being started the shafts 48 and 42 will be set into motion with the belt 52 running continuously over the loose pulley on the shaft 55, the yielding dog having been previously drawn back to release the shifter rod 55. Both shafts at this time run free and the other parts of the machine will be at a standstill. The wires are then drawn through the heads of the twisters and being carried down to the rear end of the machine are fastened to the reel. If at this time and without placing any pickets in the machine the treadle should be pressed down to set the clutch and revolve the various parts, the wire would be twisted and wound upon the reel, thereby illustrating the forcible drawing out action as distinguished from the pushing out of the fence, which latter principle is used in other machines. The pickets are fed in one by one, in the usual manner, within the loops before the twister-heads. When the wires have been twisted up close to the heads, the twisters are stopped by the engagement of the pry-bar with the pawl and the consequent separation of the clutch-parts. Just previous to this action the pin on the clutch device has forced back the lower end of the upright lever 83 thereby withdrawing the stops 22 and also the yielding dogs and drawing back the twister-rod through the link 92 and shifting the belt 52 upon the fixed pulley. The reel then revolves and before the return of the stops to their normal position the slat or picket or pickets have passed over the same so that the movement of the slats is uninterrupted until they strike against one or several of the yielding dogs, which dogs are thereby pulled back into line with the fixed stops, which results in the rocking of the bar 105 and the raising of the arm 104 to free the shipper-rod, whereupon the belt 52 is pushed back onto the loose pulley 53 by the spring 98 on the shifting bar 95 thus stopping the reel. As the throwing off of the belt takes some time, the reel does not stop instantly upon the drawing back of the yielding-dogs but continues to revolve long enough to exert such a strain upon the wires as to straighten them and indent them into the corners of the slats or pickets and also draw the pickets closely and firmly up against the fixed stops thereby maintaining a strong tension and insuring the parallelism of the pickets. This tension may be regulated by shifting the arms 99 and 100 on the shifter bar, and in operating the machine, I prefer to work up to the limit of the strength of the wire for I find that the greater the tension the more exactly parallel the slats will be and the more firmly locked in the wires. It will be seen, also, that I may use two or more lateral rows of picket-stops, but one row would not be sufficient as there could then be no means of paralleling the pickets. By adjusting the stops with respect to one another either, three, six, eight or twelve inch fence or any other sizes may be made.

The advantage derived from the position of the saws above the pickets is manifest, as the saw presses down upon the pickets and upon the bars 20 and there is no tendency to lift the fence off of the steps.

Having thus described my invention, I claim as new and desire to secure by Letters Patent—

1. The combination, with wire carriers and twisters, of longitudinally unyielding picket-stops for holding the fence, means for lowering said stops, a yielding dog to be engaged by the fence, and a reel adapted to draw out the fence, and means for operating said reel, said means being connected with said yielding dog and controlled thereby; whereby an even and uniform tension is automatically maintained upon the fence, substantially as described.

2. The combination, with the frame, of wire-carriers and twisters arranged thereon, means for operating the same, two or more transverse rows of fixed picket-stops to hold the fence, one or more yielding dogs, means for forcibly drawing out the fence when released from said picket-stops, and a connection between the drawing out mechanism and said yielding dog or dogs for stopping the action of said mechanism when said dog is engaged by the fence, substantially as described and for the purpose specified.

3. The combination, with wire-carriers and twisters, of means for operating the same intermittently, a reel arranged to operate when said twisters are stopped, two or more rows of vertically movable picket stops for holding the fence against the tension of said reel, means for lowering said stops when said twisters are stopped, a yielding dog or dogs to be engaged by the fence when moving between said stops, and a connection between said yielding dog and the reel mechanism whereby said reel is stopped by the engagement of the fence with said dog, substantially as and for the purpose set forth.

4. The combination, with the frame, of wire-carriers and twisters arranged thereon, means for operating the same, a series of vertically movable picket-stops or holders, one or more vertically movable and longitudinally yielding dogs to be engaged by the fence, the bundle reel, the operating shaft connected therewith, fixed and loose pulleys on said shaft, the power-belt, a belt shifter therefor, means for shifting said belt onto the fixed pulley, a stop for holding the same in such position, and means connected with said yielding dog or dogs for disengaging said stop and the belt shifter, substantially as and for the purpose specified.

5. The combination with the frame, of a series of wire carriers and twisters arranged thereon, means for operating the same, longitudinally arranged rotatable shafts bearing fixed picket-stops, another longitudinal rotatable shaft, a yielding picket-dog or dogs arranged thereon, the bundle reel, the operating shaft connected therewith, fixed and loose pulleys thereon, the power belt, and a belt shifter, means for shifting said belt upon the fixed pulley, a stop for holding the same in such position, and means connected with said yielding picket dog or dogs for disengaging said stop and the belt shifter, substantially as described.

6. The combination with a frame, of wire carriers and twisters arranged thereon in connection with means for operating the same, supports for the slats, longitudinally arranged shafts, two or more of said shafts provided with fixed picket-stops and one of the same provided with yielding dogs, a cushion spring therefor, a bundle reel, the operating shaft connected therewith, means for driving said shaft, means provided in connection with said yielding dog or dogs for controlling the action of said operating shaft, and an automatic stop-mechanism connected with said wire carriers and twisters, substantially as described.

7. The combination, with the frame, of the spool-frames arranged thereon, the twister-heads provided in connection therewith, a driving shaft, the shorter shaft 42, the belt extending between said shafts, the sprocket-wheel loosely journaled on the shaft 42, the friction pulley fixed on said shaft, the separable clutch parts pivoted upon said sprocket-wheel, a spring tending to force apart the said parts of said pulley, a pry bar extending between the same, a movable stop arranged in the path of said bar, and a sprocket-belt passing over said wheel to operate said spools and twisters, substantially as described.

8. The combination with the frame, of the spool-frames and spools, the twister heads and the sprocket-wheels arranged thereon, the shaft 42, the large sprocket-wheel 41, the sprocket-chain passing therefrom over the wheels on said spool-frames, the friction pulley provided on said shaft 42, the clutch parts pivoted on said sprocket wheel and having the lugs and the compressing spring, the pry-bar provided between said lugs, the movable stop pawl, a treadle connection between the frame and said pawl for disengaging said pawl from said pry-bar, the power shaft connected with the shaft 42, the bundle reel, the operating shaft connected therewith, fixed and loose pulleys thereon, the belt extending over the same from said power shaft, the cam lever arranged to be operated by the revolution of said clutch parts, picket-stops to be operated by said cam lever, a belt shifter to move said belt and adapted to be operated by said cam lever to move said belt on the fixed pulley, yielding picket dogs and a connection between the same and said shifter whereby said shifter is released to shift said belt upon the loose pulley, substantially as and for the purpose specified.

9. The combination with the frame, of wire carriers and twisters arranged thereon longitudinally, the longitudinally arranged shafts having the adjustable picket stops, an additional shaft, a slidable sleeve and picket dogs arranged thereon, a cushion spring bearing against the end of said sleeve to force the same forward, means for simultaneously rotating said shafts to lower said stops, the bundle reel, the operating shaft 55 therefor, a fixed and a loose pulley on said shaft, a belt 52, the belt shifter, a spring connected therewith for normally throwing said belt on the loose pulley, means for positively shifting the belt upon the fixed pulley, and a rod 105 having an arm 108 to engage said sleeve and having a stop arm adapted to engage said shifter substantially as and for the purpose specified.

10. The combination with a frame, of the rotatable spool frames and twister heads arranged thereon, means for operating the same, bars 20 for supporting the pickets, the longitudinally arranged rotatable shafts, the picket stops arranged thereon, said shafts provided with crank arms 24, a common connecting bar 25, a pivoted lever arranged in connection with said bar, and means for automatically and periodically operating said lever to throw said bar, substantially as described.

11. The combination with the frame, of the wire carriers and twisters, the longitudinally arranged shafts provided with the picket stops, said shafts having crank arms, the rod 25 connected therewith, a pivoted cam lever 83 pivotally connected with said rod, the shaft 42, a wheel loosely journaled thereon and a friction pulley 62 fixed on said shaft, the semi-circular clutch parts pivoted on said wheel, a spring arranged to normally press said parts upon said friction pulley, means for periodically releasing said clutch parts and permitting the same to make a single revolution, and a lug carried thereon and adapted to engage said cam lever and thereby operate the picket stops, substantially as described.

12. The combination with the frame and the wire carriers and twisters arranged thereon, the sprocket wheels 8 thereof, the power shaft 48 and the shaft 42, means for driving the latter from the former, a large sprocket wheel 41 journaled upon the shaft 42, a sprocket belt passing therefrom around the several sprocket wheels 8, the friction pulley arranged on said shaft, the pivot pin secured upon the wheel 41 and having the end piece 65, the semi-circular clutch parts 66 and 67 pivoted on said pin and having lugs 69, a bolt passing therethrough and provided with the spring 70, the pry-bar arranged between said lugs, the gravity pawl 75 arranged in the path of said pry-bar, means for lifting said pawl, picket stops arranged to be operated by the revolution of said clutch parts, and a drawing out mechanism, substantially as described.

13. The combination with the frame, of the wire carriers and twisters arranged thereon, the rotatable shafts provided with the picket stops, the power shaft, a shaft 42, a sprocket wheel 41 journaled thereon and adapted to operate said twisters, a friction pulley 62 provided on said shaft 42, the semi-circular clutch parts pivoted on said wheel 41, a spring to normally press the same together, the pry-bar 73, the pawl 75 having the rubber stop to engage said bar, a treadle, a rock shaft, picket pushers arranged to be operated therefrom, and an arm provided on said rock shaft and by means of which said pawl 75 is disengaged from said pry-bar, substantially as described.

14. The combination, with the frame, of the wire-carriers and twisters provided thereon, means for operating the same, a clutch-mechanism arranged in connection therewith, rotatable shafts 21 and 38, and means for simultaneously operating said shafts, the former provided with picket-stops 22, and the shaft 38 being provided with a yielding dog or dogs, a cushion spring for holding said dogs normally forward, the bundle reel, the shaft 55 for operating the same, fixed and loose pulleys on said shaft 55, a constantly running belt arranged on said pulleys, a shifter rod having arms to engage the sides of said belt, a spring for normally forcing back said rod to throw the belt upon the loose pulley, means in connection with said clutch for automatically shifting said belt onto the fixed pulley, a lug or arm 103 on said shifter-rod, a rocking-rod 105 provided with an arm 104 to engage said lug and having on its upper end an arm to be operated by the movement of said yielding dog, substantially as described.

15. The combination, with the frame, of the wire carriers and twisters carried thereon, and a collapsible reel composed of a bar or shaft 61 provided with inclined shoulders, the parallel bars, and links connecting said bars with said shaft 61 and adapted to rest against said inclined shoulders, whereby the bars are supported, substantially as described and for the purpose set forth.

16. The combination with a head or chuck 60, of a shaft 61 provided with inclined shoulders 115, the parallel rods or bars 112, and the pivotal links 114 pivoted on said shaft and said bars and adapted to rest against said inclined shoulders, substantially as described.

17. The combination, in a fence machine, of means for advancing the fence intermittently, the picket supporting bars 20, the picket-stops provided between said bars, an elevated rock-shaft arranged above the same, arms arranged on said rock-shaft, a saw or saws mounted upon said arms, means for dropping or forcing down said arms and saws while the pickets are held by said stops, and means for driving said saws continuously, substantially as described.

In testimony whereof I have hereunto set my hand this 26th day of July, 1892.

HENRY J. GEBHARDT.

In presence of—
A. C. PAUL,
M. E. GOOLEY.